US010764542B2

(12) United States Patent
Stewart et al.

(10) Patent No.: US 10,764,542 B2
(45) Date of Patent: Sep. 1, 2020

(54) CAMERA ACTIVATION IN RESPONSE TO FIREARM ACTIVITY

(71) Applicant: Yardarm Technologies, Inc., Capitola, CA (US)

(72) Inventors: Robert J. Stewart, Soquel, CA (US); David Glowacki, San Francisco, CA (US); James Schaff, Pacifica, CA (US); Kyle Howell, Atlanta, GA (US)

(73) Assignee: Yardarm Technologies, Inc., Capitola, CA (US)

( * ) Notice: Subject to any disclaimer, the term of this patent is extended or adjusted under 35 U.S.C. 154(b) by 483 days.

(21) Appl. No.: 14/970,104

(22) Filed: Dec. 15, 2015

(65) Prior Publication Data

US 2016/0173832 A1    Jun. 16, 2016

Related U.S. Application Data

(60) Provisional application No. 62/092,133, filed on Dec. 15, 2014.

(51) Int. Cl.
| | |
|---|---|
| *H04N 7/18* | (2006.01) |
| *F41A 17/06* | (2006.01) |
| *F41C 33/02* | (2006.01) |
| *F41A 35/00* | (2006.01) |
| *F41A 17/20* | (2006.01) |
| *H04L 29/08* | (2006.01) |

(Continued)

(52) U.S. Cl.
CPC .......... *H04N 7/185* (2013.01); *F41A 17/063* (2013.01); *F41A 17/20* (2013.01); *F41A 35/00* (2013.01); *F41C 33/029* (2013.01); *H04L 67/12* (2013.01); *H04N 5/23206* (2013.01); *H04W 4/80* (2018.02)

(58) Field of Classification Search
CPC ...................................................... H04N 7/185
USPC ...................................................... 348/158
See application file for complete search history.

(56) References Cited

U.S. PATENT DOCUMENTS

| | | |
|---|---|---|
| 4,409,670 A | 10/1983 | Herndon et al. |
| 4,863,130 A | 9/1989 | Marks, Jr. |
| 4,918,473 A | 4/1990 | Blackshear |

(Continued)

FOREIGN PATENT DOCUMENTS

| | | |
|---|---|---|
| DE | 102010019451 A1 | 11/2011 |
| GB | 2273624 A | 6/1994 |

(Continued)

OTHER PUBLICATIONS

International Search Report and Written Opinion dated Mar. 17, 2016, from the International Searching Authority, for International Patent Application No. PCT/US15/68295 (filed Dec. 31, 2015), 12 pages.

(Continued)

*Primary Examiner* — Eileen M Adams
*Assistant Examiner* — Daniel T Tekle
(74) *Attorney, Agent, or Firm* — Ascenda Law Group, PC

(57) ABSTRACT

A portable camera may be activated in response to the activity of a firearm. Furthermore, a communications channel may be established between a firearm telematics sensor and a video camera, optionally by means of intermediary devices. When the telematics sensor detects that its associated firearm has been removed from a holster of the firearm, is in motion, or is being discharged, the telematics sensor may signal the video camera to initiate recording.

18 Claims, 13 Drawing Sheets

(51) Int. Cl.
  *H04N 5/232* (2006.01)
  *H04W 4/80* (2018.01)

(56) References Cited

U.S. PATENT DOCUMENTS

| | | |
|---|---|---|
| 5,027,104 A | 6/1991 | Reid |
| 5,096,287 A | 3/1992 | Kakinami et al. |
| 5,111,289 A | 5/1992 | Lucas et al. |
| 5,289,321 A | 2/1994 | Secor |
| 5,381,155 A | 1/1995 | Gerber |
| 5,446,659 A | 8/1995 | Yamawaki |
| 5,449,103 A | 9/1995 | Tilley |
| 5,453,939 A | 9/1995 | Hoffman et al. |
| 5,473,729 A | 12/1995 | Bryant et al. |
| 5,479,149 A | 12/1995 | Pike |
| 5,497,419 A | 3/1996 | Hill |
| 5,525,966 A | 6/1996 | Parish |
| 5,526,133 A | 6/1996 | Paff |
| 5,585,798 A | 12/1996 | Yoshioka et al. |
| 5,642,285 A | 6/1997 | Woo et al. |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,163,338 A | 12/2000 | Johnson et al. |
| 6,175,300 B1 | 1/2001 | Kendrick |
| 6,298,290 B1 | 10/2001 | Abe et al. |
| 6,310,541 B1 | 10/2001 | Atkins |
| 6,314,364 B1 | 11/2001 | Nakamura |
| 6,326,900 B2 | 12/2001 | Deline et al. |
| 6,333,694 B2 | 12/2001 | Pierce et al. |
| 6,333,759 B1 | 12/2001 | Mazzilli |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,449,540 B1 | 9/2002 | Rayner |
| 6,452,572 B1 | 9/2002 | Fan et al. |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,591,242 B1 | 7/2003 | Karp et al. |
| 6,681,195 B1 | 1/2004 | Poland et al. |
| 6,697,103 B1 | 2/2004 | Fernandez et al. |
| 6,718,239 B2 | 4/2004 | Rayner |
| 6,727,816 B1 | 4/2004 | Helgeson |
| 6,748,792 B1 | 6/2004 | Freund et al. |
| 6,823,621 B2 | 11/2004 | Gotfried |
| 6,831,556 B1 | 12/2004 | Boykin |
| 6,856,873 B2 | 2/2005 | Breed et al. |
| 6,970,183 B1 | 11/2005 | Monroe |
| 7,012,632 B2 | 3/2006 | Freeman et al. |
| 7,034,683 B2 | 4/2006 | Ghazarian |
| 7,038,590 B2 | 5/2006 | Hoffman et al. |
| D529,528 S | 10/2006 | Ross, Jr. et al. |
| 7,119,832 B2 | 10/2006 | Blanco et al. |
| 7,126,472 B2 | 10/2006 | Kraus et al. |
| 7,147,155 B2 | 12/2006 | Weekes |
| 7,158,167 B1 | 1/2007 | Yerazunis et al. |
| 7,180,407 B1 | 2/2007 | Guo et al. |
| 7,190,882 B2 | 3/2007 | Gammenthaler |
| 7,359,553 B1 | 4/2008 | Wendt et al. |
| 7,371,021 B2 | 5/2008 | Ross, Jr. et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,488,996 B2 | 2/2009 | Chang |
| 7,496,140 B2 | 2/2009 | Winningstad et al. |
| 7,500,794 B1 | 3/2009 | Clark |
| 7,508,941 B1 | 3/2009 | O'Toole et al. |
| 7,536,457 B2 | 5/2009 | Miller |
| 7,539,533 B2 | 5/2009 | Tran |
| 7,561,037 B1 | 7/2009 | Monroe |
| 7,602,301 B1 | 10/2009 | Stirling et al. |
| 7,659,827 B2 | 2/2010 | Gunderson et al. |
| 7,680,947 B2 | 3/2010 | Nicholl et al. |
| 7,697,035 B1 | 4/2010 | Suber et al. |
| 7,804,426 B2 | 9/2010 | Etcheson |
| 7,806,525 B2 | 10/2010 | Howell et al. |
| 7,853,944 B2 | 12/2010 | Choe |
| 8,077,029 B1 | 12/2011 | Daniel et al. |
| 8,175,314 B1 | 5/2012 | Webster |
| 8,269,617 B2 | 9/2012 | Cook et al. |
| 8,314,708 B2 | 11/2012 | Gunderson et al. |
| 8,373,567 B2 | 2/2013 | Denson |
| 8,384,539 B2 | 2/2013 | Denny et al. |
| 8,456,293 B1 | 6/2013 | Trundle et al. |
| 8,503,972 B2 | 8/2013 | Haler et al. |
| 8,508,353 B2 | 8/2013 | Cook et al. |
| 8,520,069 B2 | 8/2013 | Haler |
| 8,606,492 B1 | 12/2013 | 8otnen |
| 8,676,428 B2 | 3/2014 | Richardson et al. |
| 8,707,758 B2 | 4/2014 | Keays |
| 8,725,462 B2 | 5/2014 | Jain et al. |
| 8,733,006 B2 | 5/2014 | Williams et al. |
| 8,744,642 B2 | 6/2014 | Nemat-Nasser et al. |
| 8,781,292 B1 | 7/2014 | Ross et al. |
| 8,849,501 B2 | 9/2014 | Cook et al. |
| 8,854,199 B2 | 10/2014 | Cook et al. |
| 8,930,072 B1 | 1/2015 | Lambert et al. |
| 8,989,914 B1 | 3/2015 | Nemat-Nasser et al. |
| 8,996,234 B1 | 3/2015 | Tamari et al. |
| 9,140,509 B2 | 9/2015 | Sullivan et al. |
| 9,253,452 B2 | 2/2016 | Ross et al. |
| 9,640,062 B2 | 5/2017 | Schuler et al. |
| 9,666,056 B2 | 5/2017 | Herrera et al. |
| 2001/0033228 A1 | 10/2001 | Kisreman et al. |
| 2002/0013517 A1 | 1/2002 | West et al. |
| 2002/0032510 A1 | 3/2002 | Turnbull et al. |
| 2002/0044065 A1 | 4/2002 | Quist et al. |
| 2002/0049881 A1 | 4/2002 | Sugimura |
| 2002/0084130 A1 | 7/2002 | Ghazarian et al. |
| 2002/0131768 A1 | 9/2002 | Gammenthaler |
| 2002/0135336 A1 | 9/2002 | Zhou et al. |
| 2002/0159434 A1 | 10/2002 | Gosior et al. |
| 2002/0191952 A1 | 12/2002 | Fiore et al. |
| 2003/0040917 A1 | 2/2003 | Fiedler |
| 2003/0080878 A1 | 5/2003 | Kirmuss |
| 2003/0081935 A1 | 5/2003 | Kirmuss |
| 2003/0081942 A1 | 5/2003 | Melnyk et al. |
| 2003/0095688 A1 | 5/2003 | Kirmuss |
| 2003/0106917 A1 | 6/2003 | Shetler et al. |
| 2003/0133018 A1 | 7/2003 | Ziemkowski |
| 2003/0173408 A1 | 9/2003 | Mosher, Jr. et al. |
| 2003/0215010 A1 | 11/2003 | Kashiwa |
| 2003/0215114 A1 | 11/2003 | Kyle |
| 2003/0222982 A1 | 12/2003 | Hamdan et al. |
| 2004/0043765 A1 | 3/2004 | Tolhurst |
| 2004/0090469 A1* | 5/2004 | Moon .......... G06F 3/0485 715/846 |
| 2004/0145457 A1 | 7/2004 | Schofield et al. |
| 2004/0168002 A1 | 8/2004 | Accarie et al. |
| 2004/0199785 A1 | 10/2004 | Pederson |
| 2004/0223054 A1 | 11/2004 | Rotholtz |
| 2005/0030151 A1 | 2/2005 | Singh |

(56) References Cited

U.S. PATENT DOCUMENTS

| | | |
|---|---|---|
| 2005/0035161 A1 | 2/2005 | Shioda |
| 2005/0046583 A1 | 3/2005 | Richards |
| 2005/0066567 A1 | 3/2005 | Newkirk et al. |
| 2005/0068169 A1 | 3/2005 | Copley et al. |
| 2005/0094966 A1 | 5/2005 | Elberbaum |
| 2005/0100329 A1 | 5/2005 | Lao et al. |
| 2005/0134966 A1 | 6/2005 | Burgner |
| 2005/0167172 A1 | 8/2005 | Fernandez |
| 2005/0206532 A1 | 9/2005 | Lock |
| 2005/0228234 A1 | 10/2005 | Yang |
| 2005/0232469 A1 | 10/2005 | Schofield et al. |
| 2006/0009238 A1 | 1/2006 | Stanco et al. |
| 2006/0028811 A1 | 2/2006 | Ross, Jr. et al. |
| 2006/0072014 A1 | 4/2006 | Geng et al. |
| 2006/0082730 A1 | 4/2006 | Franks |
| 2006/0087439 A1 | 4/2006 | Tolliver |
| 2006/0098088 A1 | 5/2006 | Raghunath |
| 2006/0158968 A1 | 7/2006 | Vanman et al. |
| 2006/0164220 A1 | 7/2006 | Harter, Jr. et al. |
| 2006/0164534 A1 | 7/2006 | Robinson et al. |
| 2006/0170770 A1 | 8/2006 | MacCarthy |
| 2006/0176149 A1 | 8/2006 | Douglas |
| 2006/0183505 A1 | 8/2006 | Willrich |
| 2006/0220826 A1 | 10/2006 | Rast |
| 2006/0244601 A1 | 11/2006 | Nishimura |
| 2006/0256822 A1 | 11/2006 | Kwong et al. |
| 2006/0270465 A1 | 11/2006 | Lee et al. |
| 2006/0274828 A1 | 12/2006 | Siemens et al. |
| 2006/0282021 A1 | 12/2006 | DeVaul et al. |
| 2006/0287821 A1 | 12/2006 | Lin |
| 2006/0293571 A1 | 12/2006 | Bao et al. |
| 2007/0021134 A1 | 1/2007 | Liou |
| 2007/0064108 A1 | 3/2007 | Haler |
| 2007/0067079 A1 | 3/2007 | Kosugi |
| 2007/0102508 A1 | 5/2007 | Mcintosh |
| 2007/0117083 A1 | 5/2007 | Winneg et al. |
| 2007/0132567 A1 | 6/2007 | Schofield et al. |
| 2007/0152811 A1 | 7/2007 | Anderson |
| 2007/0172053 A1 | 7/2007 | Poirier |
| 2007/0177023 A1 | 8/2007 | Beuhler et al. |
| 2007/0229350 A1 | 10/2007 | Scalisi et al. |
| 2007/0257781 A1 | 11/2007 | Denson |
| 2007/0257782 A1 | 11/2007 | Etcheson |
| 2007/0257804 A1 | 11/2007 | Gunderson et al. |
| 2007/0257815 A1 | 11/2007 | Gunderson et al. |
| 2007/0257987 A1 | 11/2007 | Wang |
| 2007/0260361 A1 | 11/2007 | Etcheson |
| 2007/0268158 A1 | 11/2007 | Gunderson et al. |
| 2007/0271105 A1 | 11/2007 | Gunderson et al. |
| 2007/0285222 A1 | 12/2007 | Zadnikar |
| 2007/0287425 A1 | 12/2007 | Bates |
| 2007/0297320 A1 | 12/2007 | Brummette et al. |
| 2008/0001735 A1 | 1/2008 | Tran |
| 2008/0002599 A1 | 1/2008 | Yau et al. |
| 2008/0030580 A1 | 2/2008 | Kashiwa et al. |
| 2008/0042825 A1 | 2/2008 | Denny et al. |
| 2008/0043736 A1 | 2/2008 | Stanley |
| 2008/0049830 A1 | 2/2008 | Richardson |
| 2008/0061991 A1* | 3/2008 | Urban ................ F41C 33/0209 340/573.1 |
| 2008/0063252 A1 | 3/2008 | Dobbs et al. |
| 2008/0100705 A1 | 5/2008 | Kister et al. |
| 2008/0122603 A1 | 5/2008 | Plante et al. |
| 2008/0129518 A1 | 6/2008 | Carlton-Foss |
| 2008/0143481 A1 | 6/2008 | Abraham et al. |
| 2008/0144705 A1 | 6/2008 | Rackin et al. |
| 2008/0211906 A1 | 9/2008 | Lovric |
| 2008/0239064 A1 | 10/2008 | Iwasaki |
| 2008/0246656 A1 | 10/2008 | Ghazarian |
| 2008/0266118 A1 | 10/2008 | Pierson et al. |
| 2009/0002491 A1 | 1/2009 | Haler |
| 2009/0002556 A1 | 1/2009 | Manapragada et al. |
| 2009/0070820 A1 | 3/2009 | Li |
| 2009/0122142 A1 | 5/2009 | Shapley |
| 2009/0141129 A1 | 6/2009 | Dischinger |
| 2009/0169068 A1 | 7/2009 | Okamoto |
| 2009/0207252 A1 | 8/2009 | Raghunath |
| 2009/0213204 A1 | 8/2009 | Wong |
| 2009/0243794 A1 | 10/2009 | Morrow |
| 2009/0252486 A1 | 10/2009 | Ross, Jr. et al. |
| 2010/0060734 A1 | 3/2010 | Chou |
| 2010/0177891 A1 | 7/2010 | Keidar et al. |
| 2010/0188201 A1 | 7/2010 | Cook et al. |
| 2010/0191411 A1 | 7/2010 | Cook et al. |
| 2010/0238009 A1 | 9/2010 | Cook et al. |
| 2010/0238262 A1 | 9/2010 | Kurtz et al. |
| 2010/0242076 A1 | 9/2010 | Potesta et al. |
| 2010/0250021 A1 | 9/2010 | Cook et al. |
| 2010/0265331 A1 | 10/2010 | Tanaka |
| 2011/0006151 A1 | 1/2011 | Beard |
| 2011/0018998 A1* | 1/2011 | Guzik .................... H04N 21/21 348/143 |
| 2011/0056108 A1 | 3/2011 | McCord et al. |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0173869 A1 | 7/2011 | Uhm |
| 2012/0038689 A1 | 2/2012 | Ishii |
| 2012/0056722 A1 | 3/2012 | Kawaguchi |
| 2012/0063736 A1 | 3/2012 | Simmons et al. |
| 2012/0162436 A1 | 6/2012 | Cordell et al. |
| 2012/0170905 A1* | 7/2012 | Brundula ................ H04N 5/76 386/239 |
| 2012/0189286 A1 | 7/2012 | Takayama et al. |
| 2012/0268259 A1 | 10/2012 | Igel et al. |
| 2012/0297654 A1* | 11/2012 | Williams .............. F41A 17/063 42/1.01 |
| 2013/0021153 A1 | 1/2013 | Keays |
| 2013/0080836 A1 | 3/2013 | Stergiou et al. |
| 2013/0096731 A1 | 4/2013 | Tamari et al. |
| 2013/0222640 A1 | 8/2013 | Baek et al. |
| 2014/0037262 A1 | 2/2014 | Sako et al. |
| 2014/0049636 A1 | 2/2014 | O'Donnell et al. |
| 2014/0092299 A1 | 4/2014 | Phillips et al. |
| 2014/0094992 A1 | 4/2014 | Lambert et al. |
| 2014/0162584 A1 | 6/2014 | Cope |
| 2014/0195105 A1 | 7/2014 | Lambert et al. |
| 2014/0202058 A1 | 7/2014 | Zhou |
| 2014/0210625 A1 | 7/2014 | Nemat-Nasser |
| 2014/0215885 A1 | 8/2014 | Sullivan et al. |
| 2014/0227671 A1 | 8/2014 | Olmstead et al. |
| 2014/0290110 A1* | 10/2014 | Stewart ................ F41A 17/06 42/70.11 |
| 2014/0311215 A1 | 10/2014 | Keays et al. |
| 2015/0051502 A1 | 2/2015 | Ross |
| 2015/0063776 A1 | 3/2015 | Ross et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0113851 A1* | 4/2015 | Bensayan ............. F41A 17/063 42/117 |
| 2015/0154556 A1 | 6/2015 | Skaaksrud |
| 2015/0369554 A1* | 6/2015 | Kramer ................ F41A 17/06 386/227 |
| 2015/0206419 A1 | 7/2015 | Johnson et al. |
| 2015/0254968 A1 | 9/2015 | Sanders et al. |
| 2015/0256990 A1 | 9/2015 | Vilrokx et al. |
| 2015/0369559 A1 | 12/2015 | Del Rosario |
| 2016/0086472 A1 | 3/2016 | Herrera et al. |
| 2016/0190859 A1 | 6/2016 | Blum et al. |
| 2016/0377373 A1 | 12/2016 | Feldstein |
| 2017/0003101 A1 | 1/2017 | Madrid et al. |
| 2017/0016696 A1 | 1/2017 | Koskan et al. |
| 2017/0160041 A1* | 1/2017 | Stewart ................ F41A 35/00 |
| 2017/0059265 A1 | 3/2017 | Winter et al. |
| 2017/0059274 A1 | 3/2017 | Crist et al. |
| 2017/0061781 A1 | 3/2017 | Ware et al. |

(56) References Cited

U.S. PATENT DOCUMENTS

| | | | |
|---|---|---|---|
| 2017/0238649 | A1 | 8/2017 | Buck, IV et al. |
| 2018/0231349 | A1 | 8/2018 | Wagner et al. |

FOREIGN PATENT DOCUMENTS

| | | |
|---|---|---|
| GB | 2320389 A | 6/1998 |
| GB | 2343252 A | 5/2000 |
| GB | 2351055 A | 12/2000 |
| GB | 2417151 A | 2/2006 |
| GB | 2425427 A | 10/2006 |
| GB | 2455885 A | 7/2009 |
| GB | 2485804 A | 5/2012 |
| JP | 08-153298 A | 6/1996 |
| JP | 2000137263 A | 5/2000 |
| RU | 2383915 C2 | 3/2010 |
| WO | WO 9005076 A1 | 5/1990 |
| WO | WO 9738526 A1 | 10/1997 |
| WO | WO 9831146 A1 | 7/1998 |
| WO | WO 0039556 A1 | 7/2000 |
| WO | WO 0051360 A1 | 8/2000 |
| WO | WO 0249881 A1 | 6/2002 |
| WO | WO 02095757 A2 | 11/2002 |
| WO | WO 03049446 A1 | 6/2003 |
| WO | WO 2014052898 A1 | 4/2014 |
| WO | 2014/145079 A1 | 9/2014 |
| WO | 2015/156921 A1 | 10/2015 |
| WO | 2016/048638 A1 | 3/2016 |
| WO | 2017/117617 A2 | 7/2017 |

OTHER PUBLICATIONS

Zepcam Wearable Video Technology, Zepam Mobile Video Technology, http://www.zepcam.com/product.aspx, accessed: Mar. 3, 2016, 2 pages.
WolfCom 3rd Eye, X1 AN Recorder for Police and Military, http://wolfcomusa.com/Products/Products.html, WayBack Machine captured Jul. 19, 2013, 3 pages.
WatchGuard CopVu Wearable Video Camera System, http://watchguardvideo.com/copvu/overview, WayBack Machine captured Sep. 22, 2013, 2 pages.
Wasson, Brian; "Digital Eyewearfor Law Enforcement." Wassom.com (Dec. 9, 2013), http://www.wassom.com/digital-eyewear-for-law-enforcement.html, 4 pages.
SIV Security in Vehicle Driving Partner, http://www.siv.co.kr/, accessed Mar. 4, 2016, 1 page.
Spy Chest Mini Spy Camera / Self Contained Mini camcorder / Audio & Video Recorder, http://www.spytechs.com/ spy_cameras/mini-spy-camera.htm, WayBack Machine captured May 9, 2013, 3 pages.
Stalker Vue Law Enforcement Grade Body Worn Video Camera/Recorder, http://www.stalkerradar.com/law_vue. shtml, WayBack Machine captured Sep. 28, 2013, 3 pages.
Supplementary European Search Report dated Sep. 28, 2010 in European Patent Application No. 06803645.8, 6 pages.
SUV Cam, http://www.elmo.co.jp/suv-cam/en/product/index.html, WayBack Machine captured Sep. 13, 2013, 2 pages.
Taser Axon Body on Officer Video/Police Body Camera, http://www.taser.com/products/on-officer-video/axon-body-on-officer-video, WayBack Machine captured Sep. 4, 2013.
Taser Axon Flex On-Officer Video/Police Video Camera, http://www.taser.com/products/on-officer-video/taser-axon, WayBack Machine captured Jul. 25, 2011, 3 pages.
Taser Cam Law Enforcement AudioNideo Recorder (gun mounted), http://www.taser.com/products/on-officer-video/laser-cam,WayBack Machine captured Sep. 8, 2013, 4 pages.
Tide Leader police body worn camera, http://tideleader.en.forbuyers.com/product/14899076, accessed Mar. 2, 2016, 3 pages.
uCorder Pockito Wearabel Mini Peke! Camcorder, http://www.ucorder.com/, WayBack Machine captured Aug. 27, 2013, 17 pages.
Veho MUVI HD, http://veho-uk.fastnet.co.uk/main/shop.aspx?category=CAMMUVIHD, WayBack Machine captured Mar. 10, 2013, 6 pages.
Veho MUVI portable wireless speaker with dock, http://veho-uk.fastnet.co.uk/main/shop.aspx?category=camcorder, WayBack Machine captures Mar. 10, 2013, 7 pages.
Vidmic Officer Worn Video & Radio Accessories, http://www.vidmic.com/, WayBack Machine captures Jul. 17, 2013, 1 page.
VIEVU Products, http://www.vievu.com/vievu-products/vievu-squared, WayBack Machine captured Oct. 1, 2013, 2 pages.
W. Fincham, "Data Recorders for Accident Investigation", Monitoring of Driver and Vehicle Performance (Digest No. 1997/122), Publication Date: Apr. 10, 1997, Abstract Only (2 pgs.).
"Breathalyzer." Wikipedia (last modified Aug. 14, 2014), http://en.wikipedia.org/wiki/Breathalyzer, WayBack Machine captured Sep. 4, 2014, 11 pages.
"Using In-Car Video, the Internet, and the Cloud to keep police officers safe is the subject of CopTrax live, free webinar." Stalker Press Room, Posted Date: Jul. 31, 2014, 14 pages.
Asian Wolf High Quality Angel Eye Body Video Spy Camera Recorder System, http://www.asianwolf.com/covert-bodycam-hq-angeleye.html, WayBack Machine captured Dec. 8, 2013, 3 pages.
Brick House Security Body Worn Cameras / Hidden Cameras / Covert Spy Cameras, http://www.brickhousesecurity.com, accessed Mar. 2, 2016, 3 pages.
Reveal Media RS3-SX high definition video recorder, http://www.revealmedia.com/buy-t166/cameras/rs3-sx.aspx, WayBack Machine captured Jul. 31, 2013, 2 pages.
Brown, "TP-LINK TL-WDR3500 Wireless N600 Router Review", Legitreviews.com, posted: Mar. 6, 2013, http://www.legitreviews.com/tp-link-tl-wdr3500-wireless-n600-router-review-under-50-wireless-router_2149, 5 pages.
"Controller Area Network (CAN) Overview", National Instruments White Paper (Aug. 1, 2014), 6 pages.
Digital Ally First Vu Mountable Digital Camera Video Recorder, http://www.opticsplanet.com/digital-ally-first-vu-mountable-digital...CIKohcX05rkCFSio7AodUOIAOg&ef_id=UjCGEAAAAWGEjrQF:20130925155534:s, accessed Mar. 2, 2016, 6 pages.
Drift X170, http://driftinnovation.com/support1firmware-update/x170/, accessed Mar. 2, 2016, 5 pages.
Dyna Spy Inc. hidden cameras, https://www.dynaspy.com/hidden-cameras/spy-cameras/body-worn-wearable-spy-cameras, WayBack Machine captured Jan. 22, 2013.
ECplaza HY-001 HD law enforcement DVR, http://fireeye.en.ecplaza.net/law-enforcement-dvr--238185-1619696.html, accessed Mar. 2, 2016, 4 pages.
Edesix VideoBadge, http://www.edesix.com/edesix-products, WayBack Machine captured Sep. 28, 2013, 2 pages.
S.R. Lewis, "Future System Specifications for Traffic Enforcement Equipment", S.R. 1 Source: IEE Colloquium (Digest), N 252, Publication Date: Nov. 18, 1996, Abstract only (2 pgs.).
File History of U.S. Appl. No. 13/967,151, filed Aug. 14, 2013, entitled Computer Program, Method, and System for Managing Multiple Data Recording Devices; Inventor: Ross, Stanton E. et al., (1331 pages).
File History of U.S. Appl. No. 14/040,233, filed Sep. 27, 2013, entitled Computer Program, Method, and System for Managing Multiple Data Recording Devices; Inventor: Ross, Stanton E. et al., 168 pages).
File History of U.S. Appl. No. 14/040,329, filed Sep. 27, 2013, entitled Portable Video and Imaging System; Applicant: Digital Ally, Inc., 451 pages.
File History of U.S. Appl. No. 14/517,368, filed Oct. 17, 2014, entitled Forensic Video Recording With Presence Detection; Applicant: Digital Ally, Inc., 349 pages.
Freudenrich, Craig, Ph.D.; "How Breathalyzers Work—Why Test?." HowStuffWorks, http://electronics.howstuffworks.com/gadgets/automotive/breathalyzer1.htm, accessed Mar. 2, 2016, 6 pages.
Padgette; et al., "Guide to Bluetooth Security: Recommendations of the National Institute of Standards and Technology", National

(56) References Cited

OTHER PUBLICATIONS

Institute of Standards and Technology, U.S. Dep't of Commerce, NIST Special Publication 800-121, Revision 1 (Jun. 2012), 47 pages.
http://www.k-h-b.com/subl_02.html, WayBack Machine captured Mar. 22, 2006, 2 pages.
isaw Advance Hull HD EXtreme, www.isawcam.co.kr, WayBack Machine captured Aug. 7, 2013, 2 pages.
Kopin Corporation; Home Page; Printed Date: Oct. 16, 2014; Posted Date: Unknown; <http://www.kopin.com>.
Korean Utility Model Reg. No. 20-0236817. published Oct. 8, 2001, 11 pages.
English abstrac of Korean Utility Model Reg. No. 20-0236817. accessed Mar. 1, 2016, 3 pages.
Kustom Signals VieVu, http://www.kustomsignals.com/index.php/mvideo/vievu, WayBack Machine captured Jun. 16, 2012, 3 pages.
Lea-Aid Scorpion Micro Recorder Patrol kit, http://www.leacorp.com/products/SCORPION-Micro-Recorder-Patrol-kit.html, accessed Mar. 1, 2016, 2 pages.
New Rearview-Mirror-Based Camera Display Takes the Guesswork Out of Backing Up, http://news.thomasnet.com/fullstory/rearview-mirror-display-eliminates-blind-spots-497750, accessed Feb. 26, 2016, 4 pages.
Notification Concerning Transmittal of International Preliminary Report on Patentability (Chapter I of the Patent Cooperation Treaty) dated Apr. 9, 2015; International Application No. PCT/US2013/062415; International Filing Date: Sep. 27, 2013; 6 pages.
Notification of Transmittal of the International Search Report and the Written Opinion of the International Searching Authority, or the Declaration dated Jan. 30, 2014; International Application No. PCT/US2013/062415; International Filing Date: Sep. 27, 2013; 7 pages.
Oregon Scientific ATC Chameleon Dual Lens HD Action Camera. http://www.oregonscientificstore.com/Oregon-Scientific-ATC-Chameleon-Duai-Lens-HD-Action-Camera.data, WayBack Machine captured Feb. 9, 2014, 4 pages.
Salman; et al., "Overview of the IEEE 802.15.4 standards for Low rate Wireless Personal Area Networks", 2010 7th International Symposium on Wireless Communication Systems (ISWCS), Sep. 19-22, 2010, Abstract only (2 pgs.).
Samuel W. Daskam, Law Enforcement Armed Robbery Alarm System Utilizing Recorded Voice Addresses Via Police Radio Channels, Source: Univ. of Ky, Off of Res and Eng., Serv (UKY BU107), pp. 18-22, 1975, Abstract only (1 pg.).
Panasonic Handheld AVCCAM HD Recorder/Player, http://www.panasonic.com/business/provideo/ag-hmr10.asp, WayBack Machine captured Aug. 26, 2013, 2 pages.
Point of View Cameras Military & Police, http://pointofviewcameras.com/military-police, WayBack Machine captured Dec. 10, 2013.
POV.HD System Digital Video Camera, http://www.vio-pov.com/index.php, WayBack Machine captured Nov. 27, 2013, 6 pages.
Renstrom, Joel I; "Tiny 3D Projectors Allow You to Transmit Holograms From a Cell Phone." Giant Freakin Robot (Jun. 13, 2014), http://www.giantfreakinrobot.com/sci/coming-3d-projectors-transmit-holograms-cell-phone.html, 4 pages.
Jacobson; et al., "TCP Extensions for High Performance", Newtowrk Working Group (May 1992), Request for Comment 1323, https://www.ietf.org/rfc/rfc1323.txt, 37 pages.
Scorpion Micro DV Video Audio Recorder, http://www.leacorp.com/scorpion-micro-dv-video-audio-recorder/, accessed Feb. 22, 2016, 2 pages.
U.S. Appl. No. 90/013,489, filed Apr. 16, 2015, Re-Examination of U.S. Pat. No. 8,781,292, 1362 pages.
International Search Report and Written Opinion dated Feb. 26, 2016, from the International Searching Authority, for International Patent Application No. PCT/US15/65844 (filed Dec. 15, 2015), 15 pages.

\* cited by examiner

A.

B.

A.

B.

US 10,764,542 B2

CAMERA ACTIVATION IN RESPONSE TO FIREARM ACTIVITY

CROSS-REFERENCE TO RELATED APPLICATIONS

This application claims the benefit of U.S. Provisional Application No. 62/092,133, filed Dec. 15, 2014, which is incorporated by reference in its entirety.

FIELD OF THE INVENTION

The present invention relates to apparatuses, systems, computer readable media, and methods for providing services concerning control of a portable camera in response to activity involving a firearm.

BACKGROUND

Personal video recorders as used by security and law enforcement personnel, hereafter referred to as body cameras, face many challenges in practical use. Easily portable sources of power, such as batteries, are limited in capacity and adversely impact the duration of body-camera operation. Storage media are limited in capacity and constrain the amount of video information that may be recorded. When the cameras do operate and can store their video data, it can be challenging to identify the portion of video information relevant to a specific event or incident.

Serious incidents for security and law enforcement personnel often involve use or anticipated use of a firearm.

Systems involving linking firearms and video recording have been contemplated—for example, in U.S. Pat. No. 9,140,509 to Sullivan et al., a gun-mounted "electronic evidence-collecting device"—e.g., a camera—is activated by the removal of the gun from its holster. Specifically, a light sensor mounted on the gun is covered when the gun is holstered, and when the gun is removed from its holster, the light sensor receives light and initiates the collection of gun-related data from sensors on the gun, and the sensed, gun-related data is forwarded to a portable device (e.g., a smartphone), which may then automatically call the user's partner and/or the central station to request assistance and backup. However, Sullivan's system has drawbacks—for example, it only contemplates activating data recording in response to unholstering as measured by a light sensor, and the only types of sensors it discloses are a holster sensor, a video camera, a microphone, a direction finder, a clock, and a GPS component. Additionally, Sullivan's system does not contemplate data sensing and recording devices that are not mounted on a handgun, or enabling real-time, granular event and location-based remote monitoring by integrating with a distributed system. The Sullivan system further does not contemplate metadata, or associating metadata with recorded video, as included in certain embodiments of the invention described below.

There is a need for devices and systems that facilitate reducing unnecessary power consumption (e.g., turning off or powering down the camera when needed), and reducing the amount of irrelevant or unnecessary video data to be stored and analyzed, as well as services that enable granular, real-time monitoring of firearm-related activity by a local team as well as by a remote command center. When video is generated, there is a need for facilitating review and analysis of recorded video from cameras that may concern firearm-related activity. Disclosed herein are embodiments of an invention that address those needs.

BRIEF DESCRIPTION OF THE DRAWINGS

The aspects and advantages of the invention will become more apparent upon consideration of the following detailed description, taken in conjunction with the accompanying drawings, in which like reference characters refer to like parts throughout, and in which.

DETAILED DESCRIPTION

Disclosed herein are devices/apparatuses, systems, methods, and machine readable media for implementing and using an improved service for controlling a camera. Embodiments of the present invention provide a firearm equipped with certain specialized electronic circuitry, hereafter referred to as a telematics sensor or sensor. In certain embodiments, the telematics sensor detects when a firearm is in motion, is being discharged (fired), and, in the case of handguns, the firearm's position within its holster.

As used herein, a "firearm" refers to a ranged weapon, including a handgun, rifle, Taser®, Conducted Electrical Weapon (CEW), or additional types of weapons capable of firing a bullet. Certain embodiments of the disclosure may be specifically adapted for one or more of handguns, rifles, or Tasers.

As used herein, a "camera" refers to a device comprising electrical and optical components for recording still images, video, and/or audio by imaging light from the visual spectrum, infrared spectrum, and/or other spectra. A "body camera" refers to a camera that is worn by a user.

As used herein, a "telematics sensor" refers to a device for detecting and/or recording information derived from the environment of the device, and where the device has two-way wireless communications capability.

In certain embodiments, the telematics sensor is equipped with a wireless transceiver. In some embodiments, the transceiver communicates directly with a body camera; in others it communicates indirectly, via an intermediary device, or devices, and one or more network topologies. One embodiment includes the telematics sensor communicating with a smartphone, which relays the sensor's messages via wide-area or personal-area networks, which in turn connect with and relay the sensor's messages to the body camera.

In certain embodiments, unholstering of a firearm (as detected by a telematics sensor) initiates recording of video by a body camera. That is, when the firearm is unholstered, the sensor detects the event and signals the body camera (either directly or indirectly) to power up (or wake from standby) and begin recording video information. The recording may be saved locally and/or may be transmitted to a remote facility where it is stored.

In some embodiments, the body camera is able to record additional, non-video metadata as part of its functionality. The telematics sensor and/or associated software may discover and detect when a camera possesses such capabilities. Upon detection, the telematics sensor may provide additional metadata and other data to the body camera for storage with its video recording. Examples of such data may include: time, date, event identifiers, location coordinates, altitude, temperature, ammunition discharged, ammunition remaining, ammunition reloads, firearm orientation, firearm movement, firearm translation, firearm bearing, recorded audio in front of and around the firearm, and recorded video in front of and around the firearm.

Figure 1:
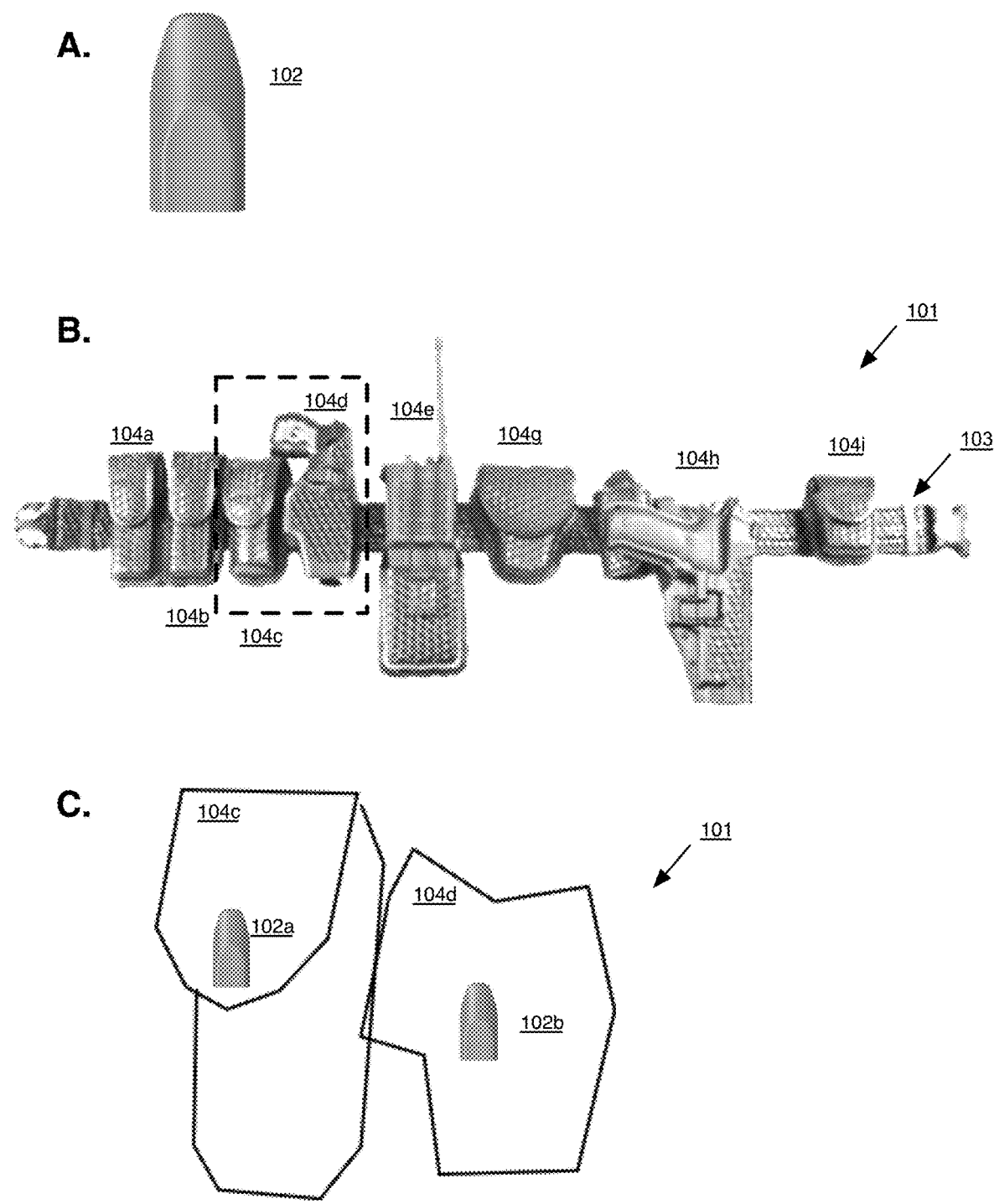
FIG. 1 shows views of exemplary holster telematics sensors, in accordance with some embodiments of the invention.

FIG. 1 shows views of exemplary holster telematics sensors 102. FIG. 1A shows an isolated exemplary holster telematics sensor 102. FIG. 1B shows components of an exemplary system 101 that makes use of holster telematics sensors 102. System 101 includes a utility belt 103 with attached holsters 104a-i. Each of holsters 104a-i may incorporate a holster telematics sensor 102, for use in detecting when an instrument, such as a firearm, pepper spray, baton, handcuffs, or a radio, is present or absent from the respective holster 104. As shown in FIG. 1C, for example, holsters 104c and 104d from system 101 may each be associated with a respective holster sensor 102. A holster sensor 102 may be attached to a flap of holster 104, or may be attached to the exterior of holster 104, or may be integrated between or within the materials of holster 104.

Figure 2:
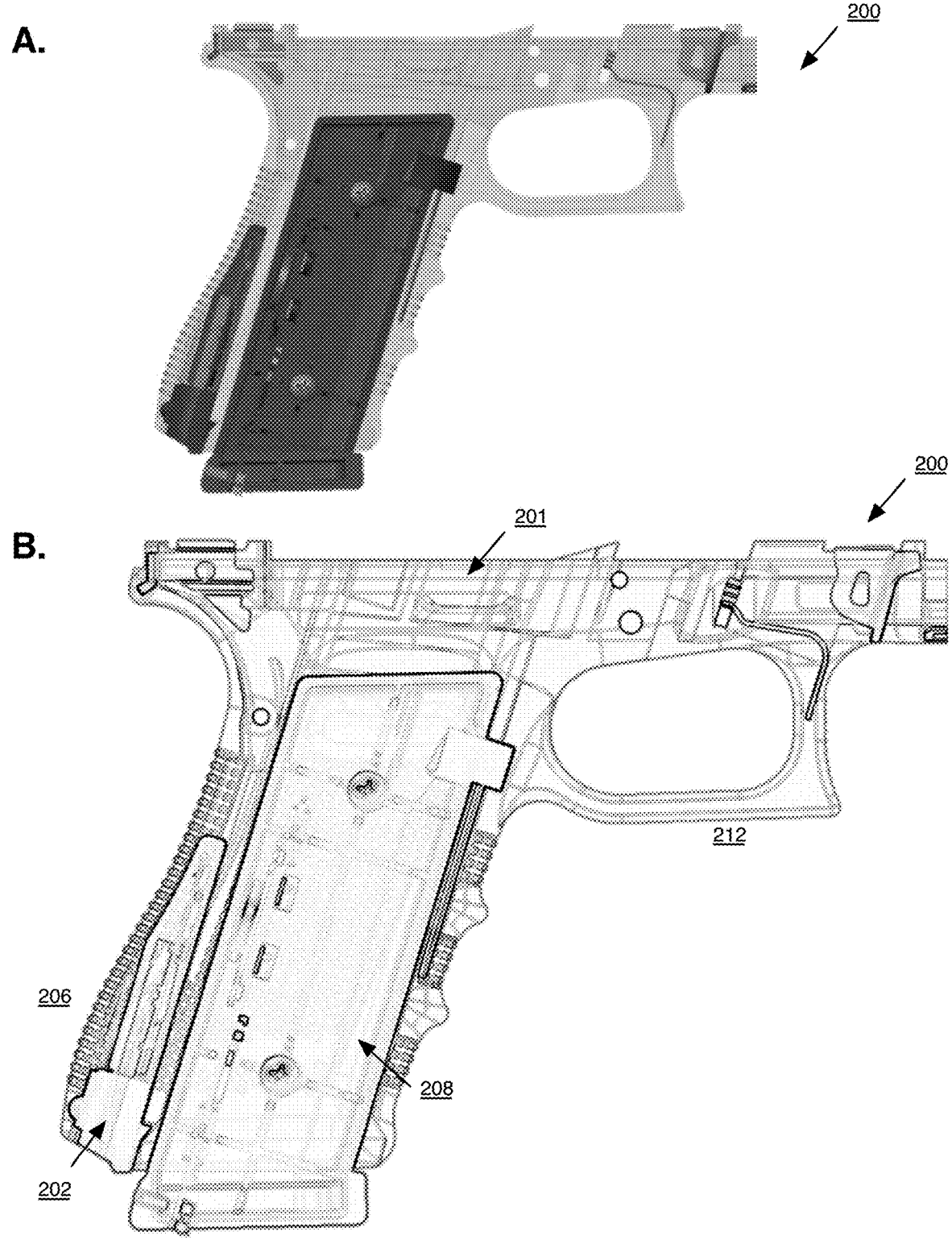
FIG. 2 shows views of a system containing an exemplary firearm telematics sensor, in accordance with some embodiments of the invention.

FIG. 2 shows views of a system 200 containing an exemplary firearm telematics sensor 202. As shown in FIG. 2B, firearm telematics sensor 202 may be integrated into the grip 206 of a handgun 201. In certain embodiments, firearm telematics sensor 202 may be mounted to the slide or sight, or the trigger guide 212 of handgun 201. In certain embodiments, firearm telematics sensor 202 may be charged by a charging device 208 that may be inserted into the magazine chamber of handgun 201. In certain embodiments, a firearm telematics sensor 202 may be used to detect, for example, one or more of: ambient temperature; firearm movement, translation, and bearing; and events such as discharge of a weapon (e.g., firing a bullet) and holstering or unholstering of the firearm.

Figure 3:
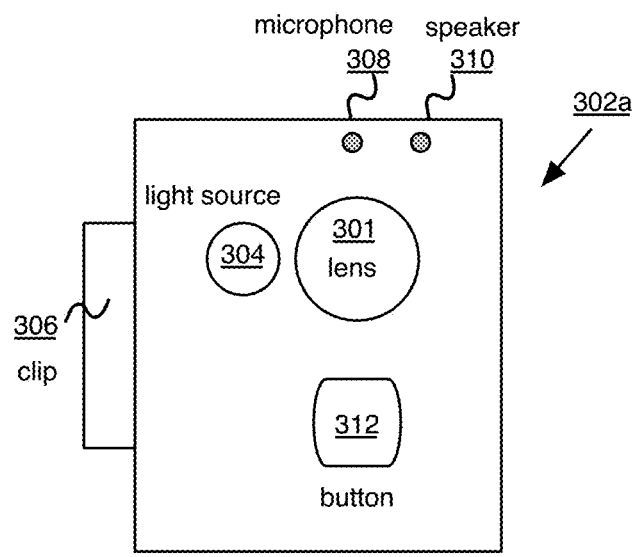
FIG. 3 shows exemplary cameras, in accordance with some embodiments of the invention.
Figure 3:
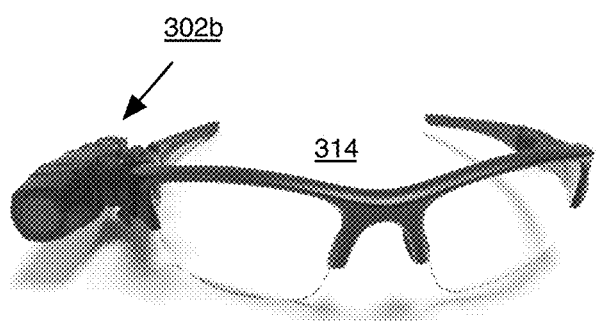

FIG. 3 shows exemplary cameras for use in a service of the invention. FIG. 3A shows a camera 302a that includes a lens 301 that may be covered by a lens cover that is transparent or is remotely controlled; one or more light sources 304, e.g., a light-emitting diode (LED), that may provide a flash or infrared illumination for night vision. Camera 302a may include a clip 306 for attaching the camera to a vest, lapel, or epaulet. In certain embodiments, the camera 302 is worn on a lanyard or strapped to the body of a user such as a police officer or security personnel. Camera 302a may include a microphone 308 for recording audio, and a speaker 310 for playing audio or providing audio feedback. Camera 302a may further include one or more buttons 312, or switches, or other user interface elements for directly controlling the camera's operation, such as for starting or stopping a recording. FIG. 3B shows a camera 302b mounted to glasses 314. In certain embodiments, a user may wear more than one camera 302 (such as both chest-mounted camera 302a and glasses-mounted camera 302b) that are all controlled by embodiments of the system described herein.

Figure 4:
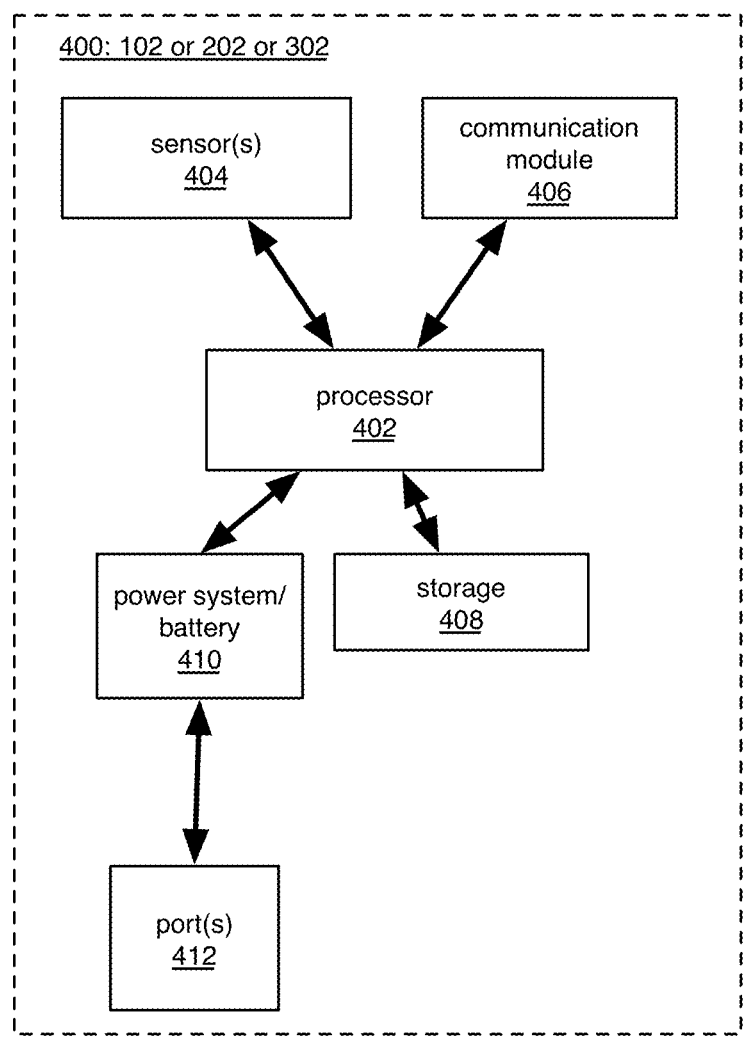
FIG. 4 shows a block diagram of a device that may embody a telematics sensor or a camera, in accordance with some embodiments of the invention.

FIG. 4 shows a block diagram of a device 400 that may embody a telematics sensor (e.g., holster telematics sensor 102 or firearm telematics sensor 202) or a camera 302. Device 400 includes a processor 402 that may be in communication with one or more sensors 404, a communication module 406, a storage component 408, and a power system and/or battery 410. The power system/battery 410 may be in communication with one or more port(s) 412.

Device 400 may include one or more sensors 404—e.g., a temperature sensor for monitoring thermal load or ambient temperature, an accelerometer, a magnetometer, a gyroscope, a metal sensor (e.g., pulse induction sensor components), optical/light sensor, microphone, etc. Communication module 406 may include a subscriber identity module (SIM) card, cellular radio, Bluetooth radio, ZigBee radio, Near Field Communication (NFC) radio, wireless local area network (WLAN) radio, GPS receiver, and antennas used by each for communicating data over various networks. Storage 408 may include one or more types of computer readable medium, such as RAM, optical storage devices, or flash memory, and may store an operating system, applications, and communication procedures. The power system/battery 410 may include a power management system, one or more power sources such as a battery and recharging system, AC, DC, a power status indicator, and the like.

Figure 5:
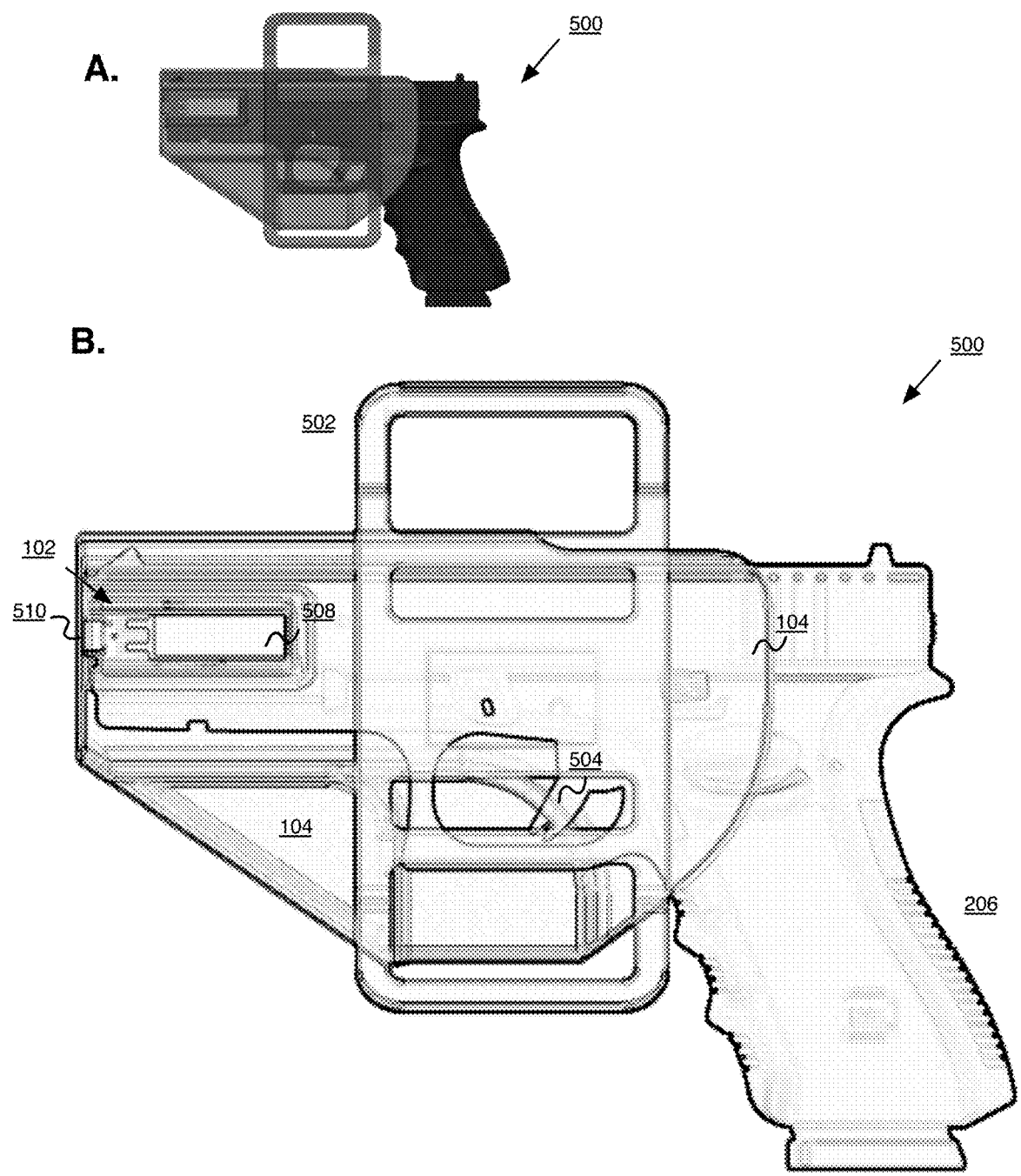
FIG. 5 shows views of an exemplary holster telematics sensor, in accordance with some embodiments of the invention.

FIG. 5 shows views of an exemplary holster telematics sensor system 500, including a holster telematics sensor 102 attached to a holster 104 having a belt clip 502, and where the holster 104 is shown to contain a holstered handgun with trigger 504 and grip 206. Holster telematics sensor 102 may include a battery 508 and a port 510. Port 510 may be, e.g., a Universal Serial Bus (USB) port, a microUSB port, a Lightning™ port, and the like.

Figure 6:
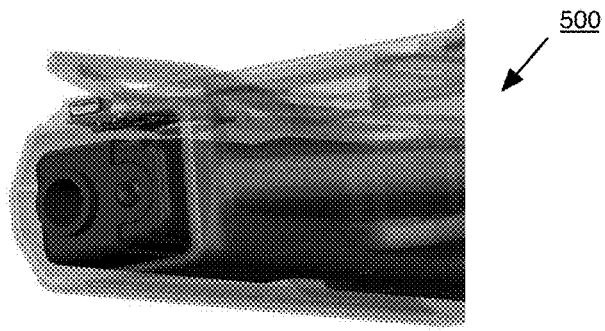
FIG. 6 shows views of an exemplary holster telematics sensor, in accordance with some embodiments of the invention.
Figure 6:
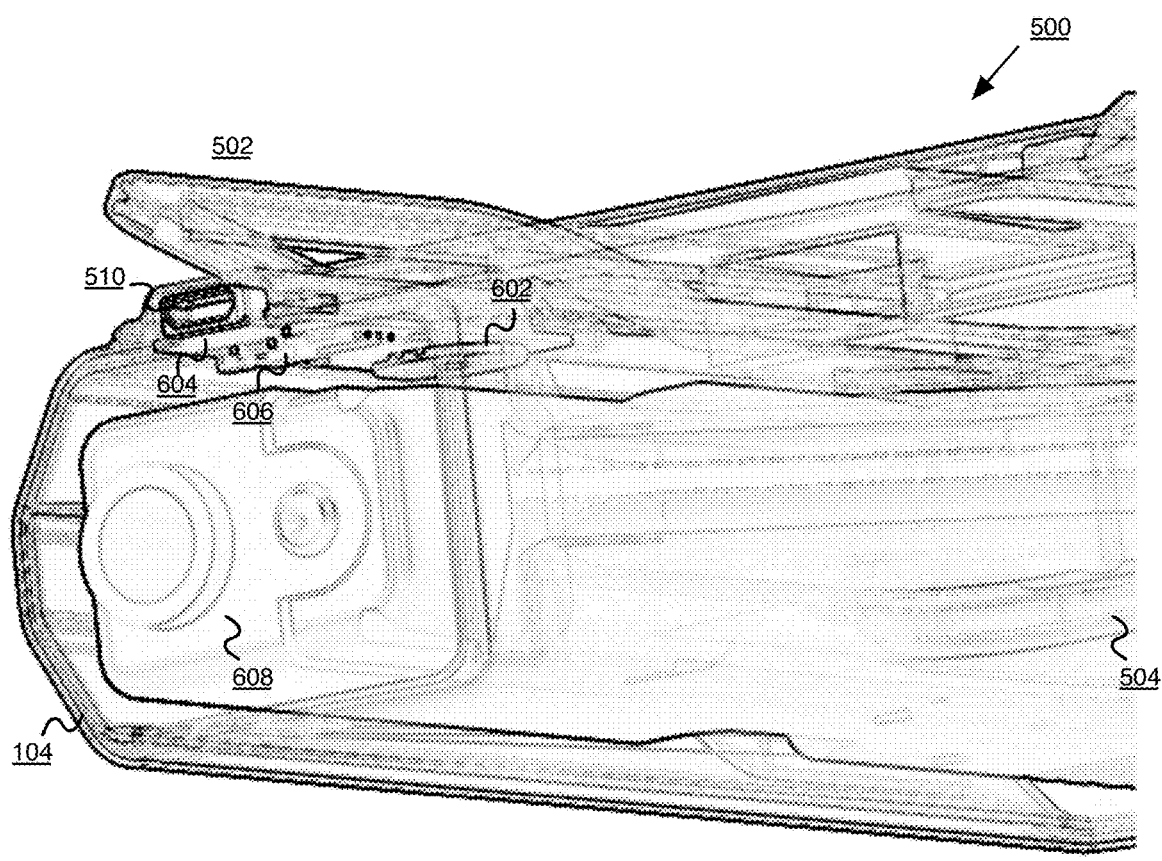

FIG. 6 shows views of an exemplary holster telematics sensor system 500. FIG. 6B shows a rotated view of the system 500 shown in FIG. 5. In the embodiment shown here, holster telematics sensor 102 includes a pulse induction coil 602 mounted on circuit board 604 with companion circuitry 606 for detecting the presence of a firearm based on the presence of the metal of the firearm (e.g., the receiver, muzzle 608, etc.). In other examples, holster telematics sensor 102 may use very low frequency (VLF) technology to detect whether a firearm is present based on the presence of metal, or components to measure the dielectric change when metal is present or absent, NFC to communicate between sensors on a firearm and a holster, or a light sensor to detect whether light is absent, indicating a firearm is holstered.

Figure 7:
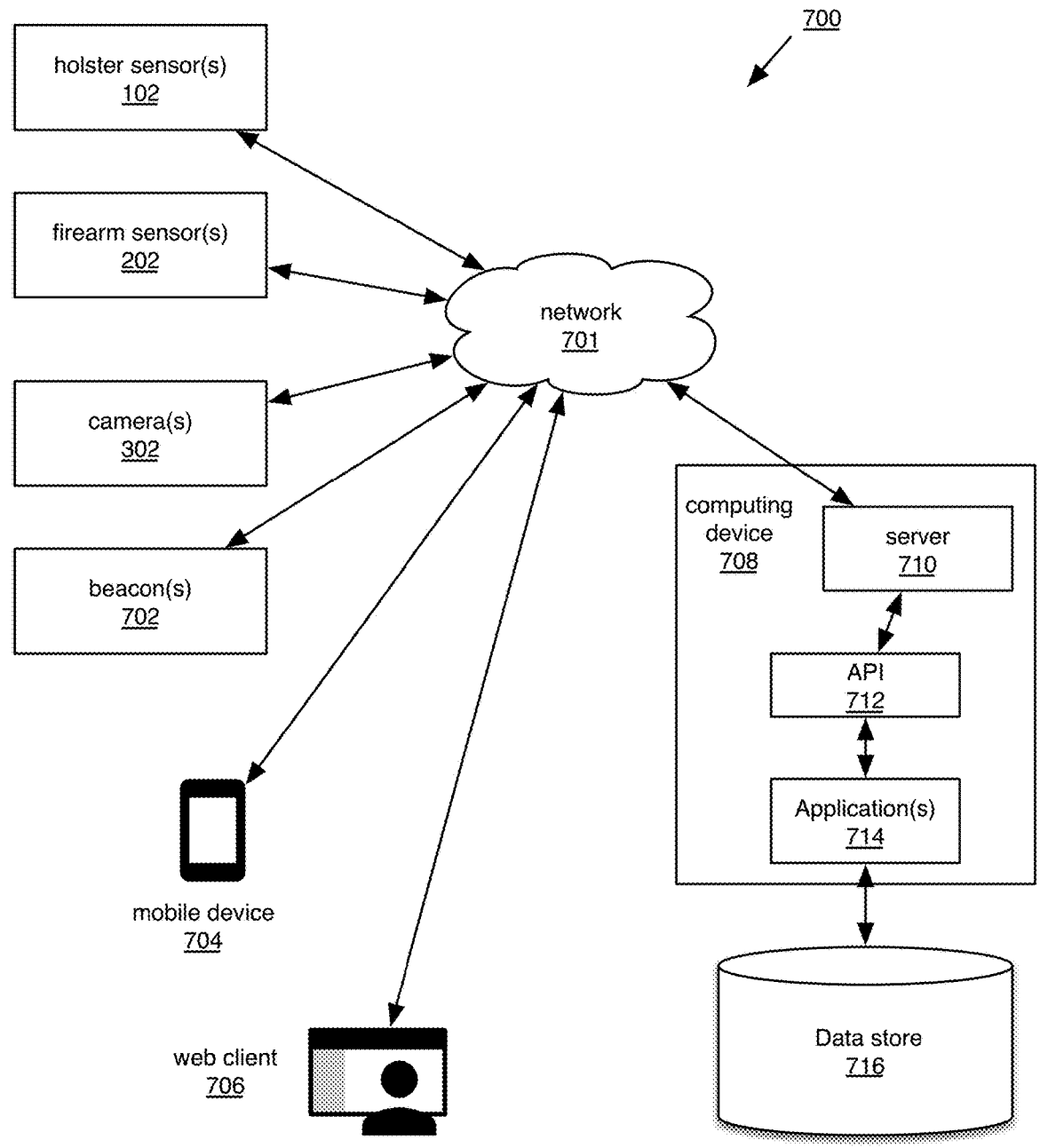
FIG. 7 is a block diagram showing exemplary data flows for an exemplary system in accordance with some embodiments of the invention.

FIG. 7 is a block diagram showing exemplary data flows for an exemplary system 700. In certain embodiments, data regarding the status of a component of system 700 and or the environment of system 700 (including, for example, a firearm and a holster) may be generated at holster telematics sensor(s) 102, firearm telematics sensor(s) 202, camera(s) 302, beacon 702, and/or mobile device 704. In certain embodiments, this data may be shared between components of the system (e.g., holster telematics sensor(s) 102, firearm telematics sensor(s) 202, camera(s) 302, beacon 702, and/or mobile device 704) on a local area network such as a Bluetooth or ZigBee even in the absence of a wireless connection providing communication with geographically remote devices (e.g., the device executing web client 706 or computing device 708 hosting server 710).

In certain embodiments, beacon(s) 702 may be proximity beacons, such as devices using the Google Eddystone™, iBeacon™, FlyBell™, and/or BLE protocols for monitoring and ranging proximity of components of the system (e.g. holster telematics sensor(s) 102, firearm telematics sensor(s) 202, camera(s) 302, and/or mobile device 704) with respect to one or more beacons 702. In certain embodiments, one or more beacons 702 may be positioned at a fixed location or a moving location such as a vehicle.

In certain embodiments, mobile device 704 may be a smartphone, a tablet computer, or a radio, such as a police radio, and web client 706 may be executed at a command and control center (e.g., for police, military, or security professionals). All components of the system 700 are directly or indirectly connected using a combination of communication protocols represented by network 701. Network 701 may include a LAN, wired or wireless network, private or public network, or the internet, including wireless communication protocols such as General Packet Radio Service (GPRS), Enhanced Data rates for GSM Evolution (EDGE), 3G, 4G, Long Term Evolution (LTE) protocols, and communication standards such as Project 25 (P25), Terrestrial Trunked Radio (TETRA), and satellite and/or field radio protocols.

In certain embodiments, one or more computing devices 708 hosts a server 710, such as an HTTP server, and an application 714 that implements aspects of the remote monitoring system (e.g., a situational intelligence platform). For example, status-related files and/or user account information may be stored in data store 716. Application 714 may support an Application Programming Interface (API) 712 providing external access to methods for accessing data store 716. In certain embodiments, client applications running on client devices 102, 202, 302, 702, 704, and 706 may access API 712 via server 710 using protocols such as HTTP or FTP.

Figure 8:
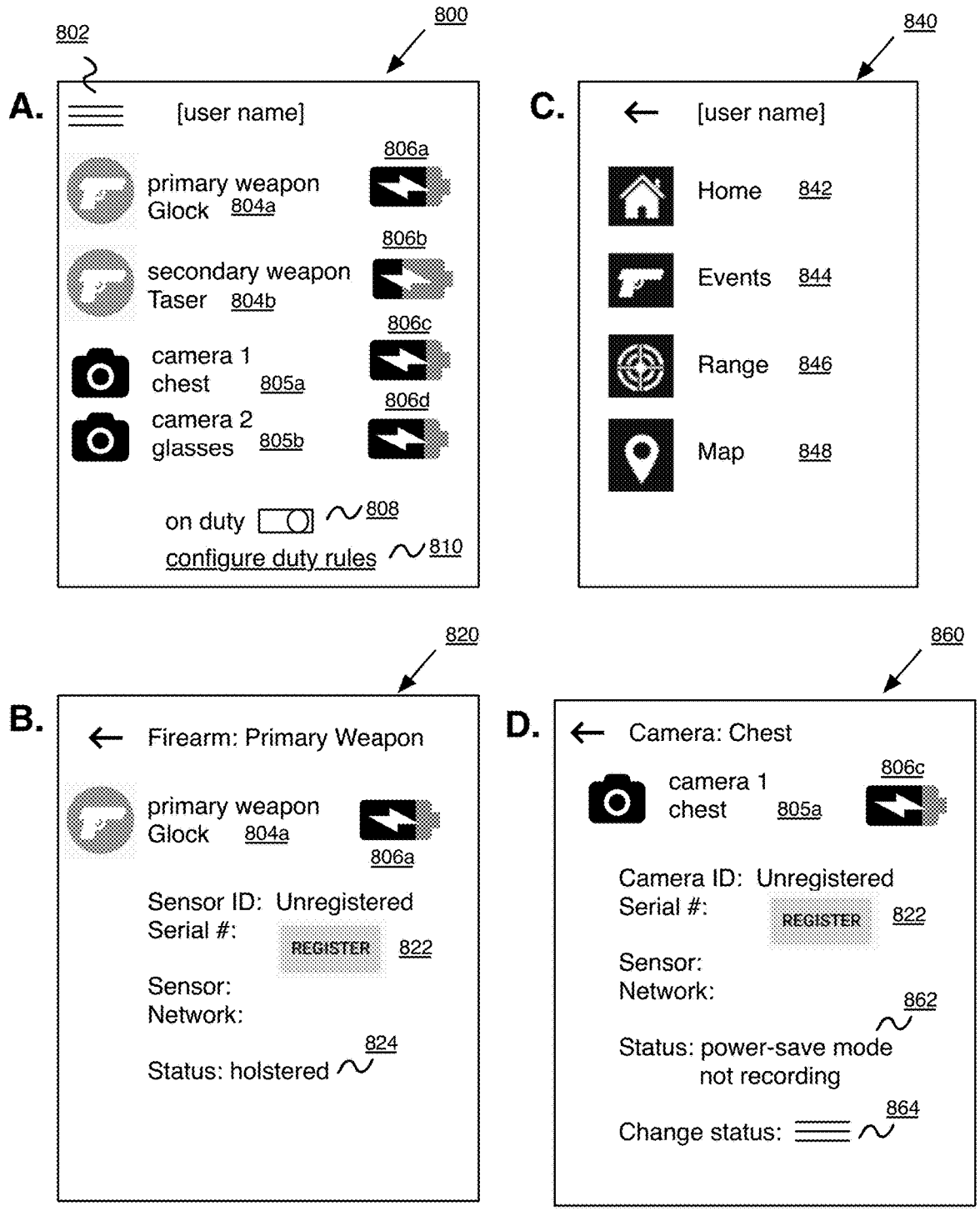
FIG. 8 shows four exemplary user interfaces for use in a system including camera control relating to firearm activity, in accordance with some embodiments of the invention.

FIG. 8 shows four exemplary user interfaces for use in a system including camera control relating to firearm activity. FIG. 8A shows a user interface 800 displaying a list of firearms 804 and cameras 805 (e.g., representing cameras 302) available in a firearm remote monitoring system. In one embodiment of such a system, each firearm 804 is associated with a battery-powered accessory device, and the status of the battery for each device is shown using icons 806. Icons 806 may also be used to represent the remaining battery life for the respective cameras 302. As shown, the accessory device associated with firearm 804a has greater charge remaining than firearm 804b. User interface 800 further includes an on-duty toggle 808 to control whether the system should monitor the associated firearms in "on duty mode" vs. "off duty mode". For example, a user may desire a different rule set to apply with respect to camera activation while the user is on duty vs. off duty—for example, a user may desire to have an associated camera not be activated while the user is off duty (e.g., at the shooting range) and an associated firearm is discharged, because the resulting camera footage may not be of interest. User interface 800 may include a link to a settings menu 810 allowing the user to configure rules for on- and off-duty states. User interface 800 may further provide a drop-down menu 802 to access additional options, e.g., user interface 840 shown in FIG. 8C.

In certain embodiments, the system may distribute an updated rule set in real time to one or more local systems (where a local system is one or more of the following devices that may be associated with a single user: holster telematics sensors 102, firearm sensors 202, cameras 302, and mobile device 702). The updated rule set may change the configuration of behavior in response to the identification of one or more types of events, or may change how an event is identified. In certain embodiments, an updated rule set may include an instruction to change the status of the camera upon receiving the updated rule set. In certain embodiments, distribution of the updated rule set may be triggered by an instruction from a remote command center (e.g., by way of web client 706 and/or server 710). For example, if a team of users is entering a dangerous area, a user at a remote command center may cause the system to distribute an updated rule set to all users of the team instructing each local system to immediately turn on all cameras 302 and ensure that if a weapon discharge is identified at any single local system of the team, a notification is provided to all other members of the team and to the remote command center.

In some embodiments, selecting a particular firearm 804 in user interface 800 may display user interface 820, shown in FIG. 8B. User interface 820 may be used to register a firearm telematics sensor 202 upon selecting register button 822. Such an interface may be further modified to display additional information about the charging status for the firearm telematics sensor 202 that is associated with firearm 804a. User interface 820 may also display additional information about a firearm and its associated system components—e.g., firearm telematics sensor 202, charging devices, hub devices. A hub device may be a mobile device that is paired with or local to firearm telematics sensor 202 and/or holster telematics sensor 102, e.g., mobile device 704. For example, the information may include the location of each component plotted on a map, the serial number or ID for the components, the user associated with each component, whether/how each component is connected to a network and/or links to other UIs for displaying such information, such as the interfaces shown in FIGS. 9-10.

Figure 9:
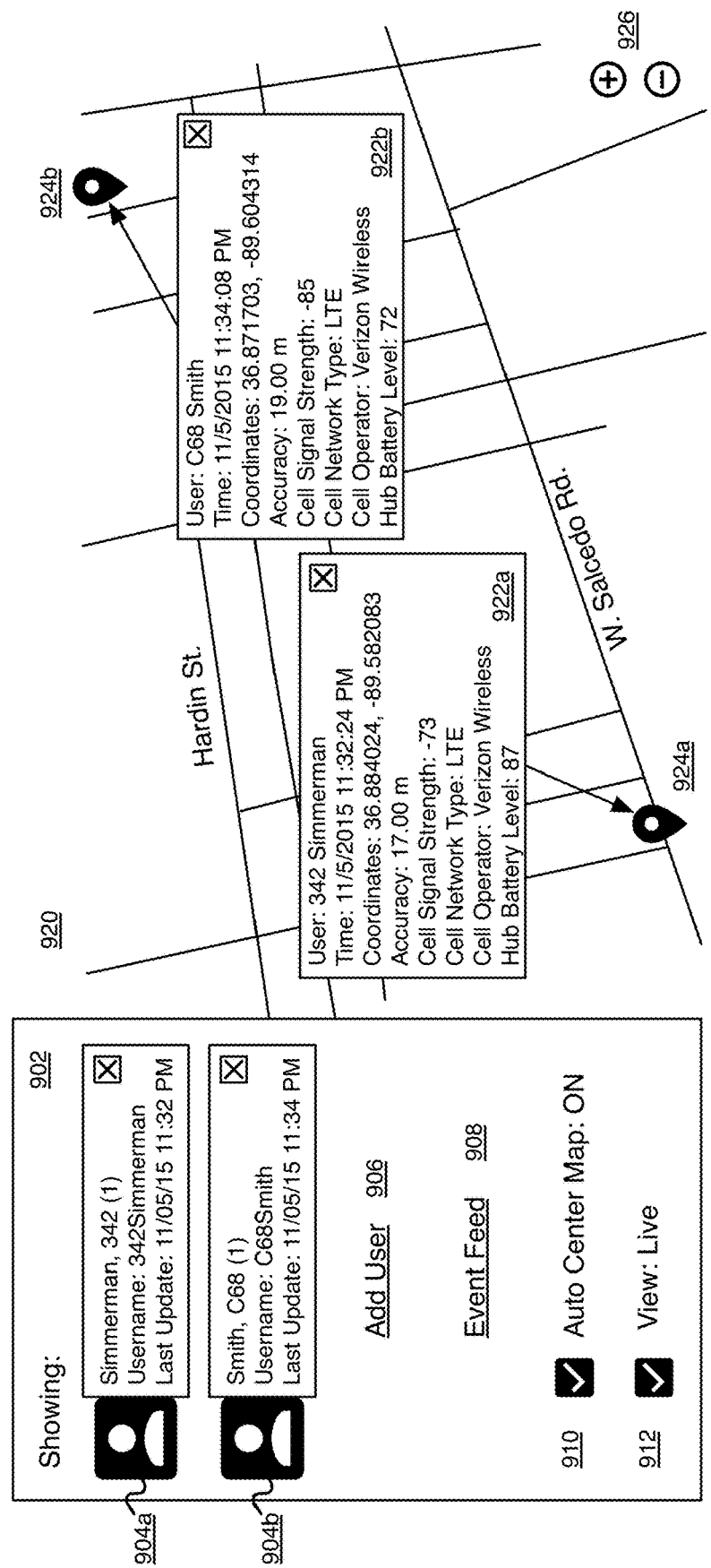
FIG. 9 shows an exemplary user interface for use in a system including camera control relating to firearm activity, in accordance with some embodiments of the invention.
Figure 10:
FIG. 10 shows an exemplary user interface for use in a system including camera control relating to firearm activity, in accordance with some embodiments of the invention.

FIG. 8C shows an exemplary user interface 840 providing access to a home link 842, an events link 844 (see, e.g., FIG. 10), a range link 846 concerning use at a gun range, and a map link 848 for accessing a display of the locations of system components (see, e.g., FIGS. 9-10).

In some embodiments, selecting a particular camera 805 in user interface 800 may display user interface 860, shown in FIG. 8D. User interface 860 may be used to register a physical camera 302 upon selecting register button 822. User interface 860 may further display information about the status of a camera (see, e.g., status indicator 862 indicating that the camera represented by 805*a* is in power save mode and is not currently recording video or audio). Possible status information may include the location of the camera, camera is powered down, camera is in power save mode, active, ready to record, in infrared/night vision mode, currently recording audio and/or video, not currently recording, in playback mode, recording a firearm-related event, and the like. Menu 864 may provide a mechanism for a user to change the status of camera 302, e.g., from mobile device 704 or web client 706.

FIG. 9 shows an exemplary user interface 900 for use in a system including camera control relating to firearm activity. Such an interface may be used for displaying the locations of system components (e.g., a firearm and associated sensors 102 and 202, and cameras 302). Panel 902 provides a listing of two users 904*a* and 904*b*; components associated with those users are displayed on a map in panel 920. Panel 902 further provides a link 906 to add an additional user to the display, and a link 908 to access an event feed (see FIG. 10). Toggle 910 controls a map centering option and toggle 912 controls whether the display in panel 920 updates to display live information or stops refreshing.

Map panel 920 marks the location of the components associated with the users on the map using location markers 924. The map may be stylized as shown, or may constitute a satellite photograph. A user may adjust the scale of the map using controls 926. Additional information associated with the components at each location 924 is displayed in an overlay window 922. For example, the overlay window 922 provides information about (1) the user associated with the component(s) at the location; (2) the time stamp associated with the information; (3) the coordinates of the location; (4) the accuracy/error estimate for the location; (5) information about the network type, strength, and operator; (6) hub device battery status. In certain embodiments, additional information about camera status could be provided as well.

FIG. 10 shows an exemplary user interface 1000 for use in a system including camera control relating to firearm activity. User interface 1000 may be used to view an event feed (panel 1002) alongside the locations associated with each event (displayed in panel 1010, showing a satellite image for the map). Panel 1002 may display individual events 1006 (e.g., status change from "Weapon Holstered" to "Weapon Unholstered", or the reverse, or simply a list of the status for each component being monitored each time it is reported by a hub device or directly from another component such as a holster telematics sensor 102), along with additional information such as the associated user name, a time stamp, and the event type. Events may be associated with icons 1008 to quickly indicate the category of event. An event feed may be manually refreshed using a control 1004—for example, in certain embodiments, this may cause the system to poll each component to report its current status, or in other embodiments, it may update the list of components being tracked and/or displayed in user interface 1000.

Figure 11:
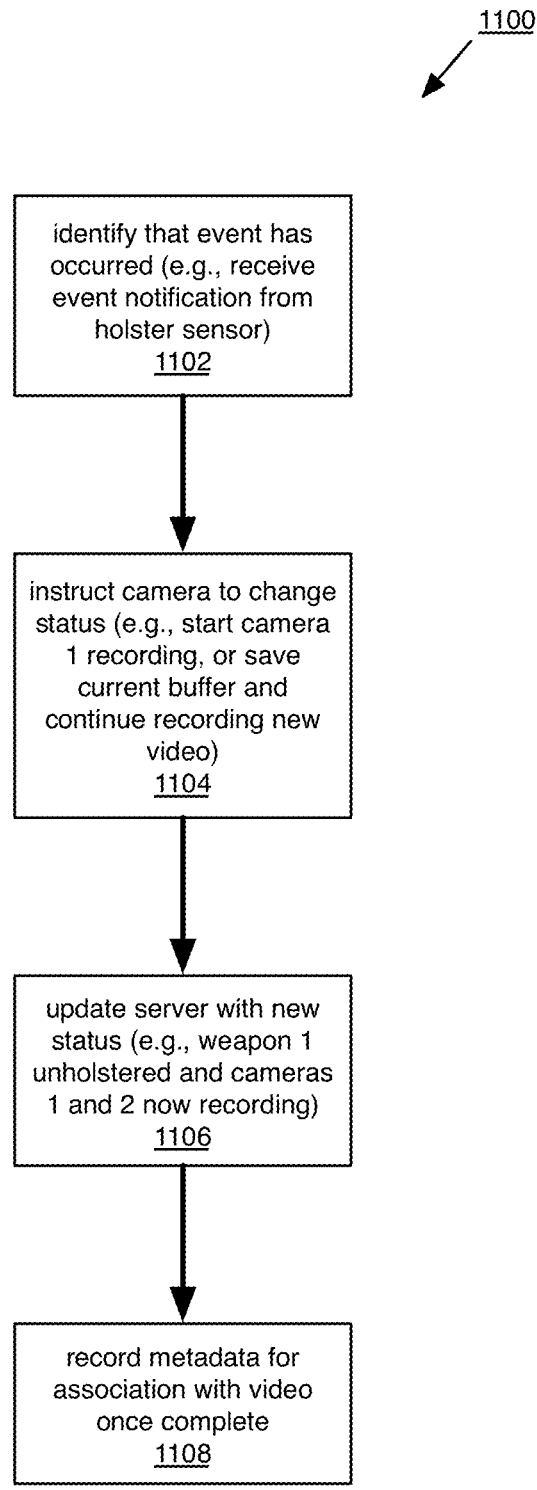
FIG. 11 is a flow chart depicting an exemplary method for controlling a camera, in accordance with some embodiments of the invention.

FIG. 11 is a flow chart depicting an exemplary process 1100 for controlling a camera. The process begins when the system has identified that a firearm-related event has occurred (1102). For example, one or more of holster telematics sensors 102, firearm sensors 202, beacons 702, or mobile device 704 may have detected an event. Events or event types that could be monitored using user interface 1000 in FIG. 10 above, or concern step 1102 in process 1100 may be, for example, user exits a vehicle with a firearm, user enters a vehicle with a firearm, holstering a firearm, unholstering a firearm, holstering or unholstering a policing implement such as a radio, discharging a firearm (e.g., discharging a Taser or firing a bullet), approaching a second user of the system, a firearm is separated from the user, loud noise is detected, and receiving a notification from a second user of the system or dispatch or command.

Additional examples regarding step 1102 may be, for example, using geofencing techniques and a beacon 702 located at a user's vehicle. When one or more of holster telematics sensors 102, firearm sensors 202, or mobile device 704 is no longer within range of the beacon 702 at the vehicle, or moves beyond a certain distance (e.g., 3, 5, 7, 10, 15 feet) from the beacon 702, the system may identify that the user has exited the vehicle (e.g., with a firearm). In another example, a holster telematics sensor 102 may detect the event of a user unholstering the firearm. In another example, a telematics sensor or mobile device 704 may detect the proximity of another user, causing the system to identify the event of approaching a second user of the system. In another example, dispatch or another member of the unit that the user is a member of, perhaps aware of a dangerous situation or that another user has unholstered her weapon, may cause the event of a notification having been received by the system by transmitting such a notification via a mobile device 704 or web client 706. In certain embodiments, the system may be configured to automatically provide a notification to all members of a group upon detecting an event concerning another member of the group.

In step 1104, the system may instruct one or more cameras 302 to change status in response to the event. For example, the instruction may be to turn on the camera, wake the camera, activate recording of video at the camera, mark existing video to be retained, and/or mark new video to be retained. In certain embodiments, the camera is constantly or usually recording (e.g., the camera may always be in a recording state when the user is in an on-duty status), and the old video may be periodically overwritten by newly recorded video. In such an embodiment, identification of an event (step 1102) may cause the existing video recording to be marked to be retained (e.g., prevent it from being overwritten by new video). In certain embodiments, a set buffer of recorded video is maintained by the camera 302, and identification of an event will cause the camera to save the existing buffer as well as video recorded after identification of the event. In certain embodiments, the buffer is 5, 10, 30, 60, 120, or 500 seconds. In certain embodiments, the buffer is 5, 10, or 15 minutes. In certain embodiments, the video may be saved by the camera, and in certain embodiments, the video may be streamed or transmitted to mobile device 704 or server 710. In certain embodiments, an instruction to change the status of a camera 302 may be received from mobile device 704 or computing device 708. Such a request may also be initiated by web client 706.

In step 1106, a component of the local system (e.g., holster telematics sensors 102, firearm sensors 202, cameras 302, or mobile device 704) may notify server 710 with the updated status for the camera(s). By this step, the system enables real time, remote monitoring of events and recording of events by the camera(s). In the absence of an available connection with remote devices (e.g., computing device 708, server 710), other local users, e.g., within a unit in the same geographical area, may share updated status across the unit using personal area networks and/or local area networks. In certain embodiments, the notification may constitute or include an alert message to communicate a dangerous situation to dispatch and/or unit members. An alert may be a prominent notification displayed on, for example, a mobile device 704 or web client 706.

In step 1108, a component of the local system (e.g., holster telematics sensors 102, firearm sensors 202, cameras 302, or mobile device 704) may record various metadata for association with the event and recorded video concerning the event. In certain embodiments, metadata are constantly recorded, and in step 1108 they are associated with the event and video. In certain embodiments, one or more types of metadata commence being recorded upon identification of the event in step 1102. In certain embodiments, each category of metadata may be saved as a separate track—for example, each category of metadata may be separately associated with the video recording. In one example, for each metadata measurement, the information is associated with a start time and an end time (or a single time point) that corresponds to the time parameter for the video recorded by each camera 302. In certain embodiments, the system may provide a user interface for selecting which categories of metadata should be displayed with the video recording (e.g., using the same mechanism used for displaying subtitles). In certain embodiments, the system may provide a user interface for rendering a video file that is "watermarked" with selected categories of metadata.

Categories of metadata may include, for example, a time stamp, the category of event, the current date, coordinates for the location of one or more components of the local system, altitude, temperature, firearm orientation, firearm movement, firearm translation, and firearm bearing (e.g., N30° E). Metadata may further include the ammunition type (e.g., 0.380 ACP, 0.45 ACP), and/or the remaining ammunition (e.g., 10 of 15 rounds).

The consequence of identifying an event (e.g., the rules concerning each event, and the particulars of process 1100 and, e.g., steps 1104 and 1106) may be configured, e.g. through a user interface accessed via link 810 in user interface 800, and such configurations may be retained in data store 716 and/or mobile device 704.

Figure 12:
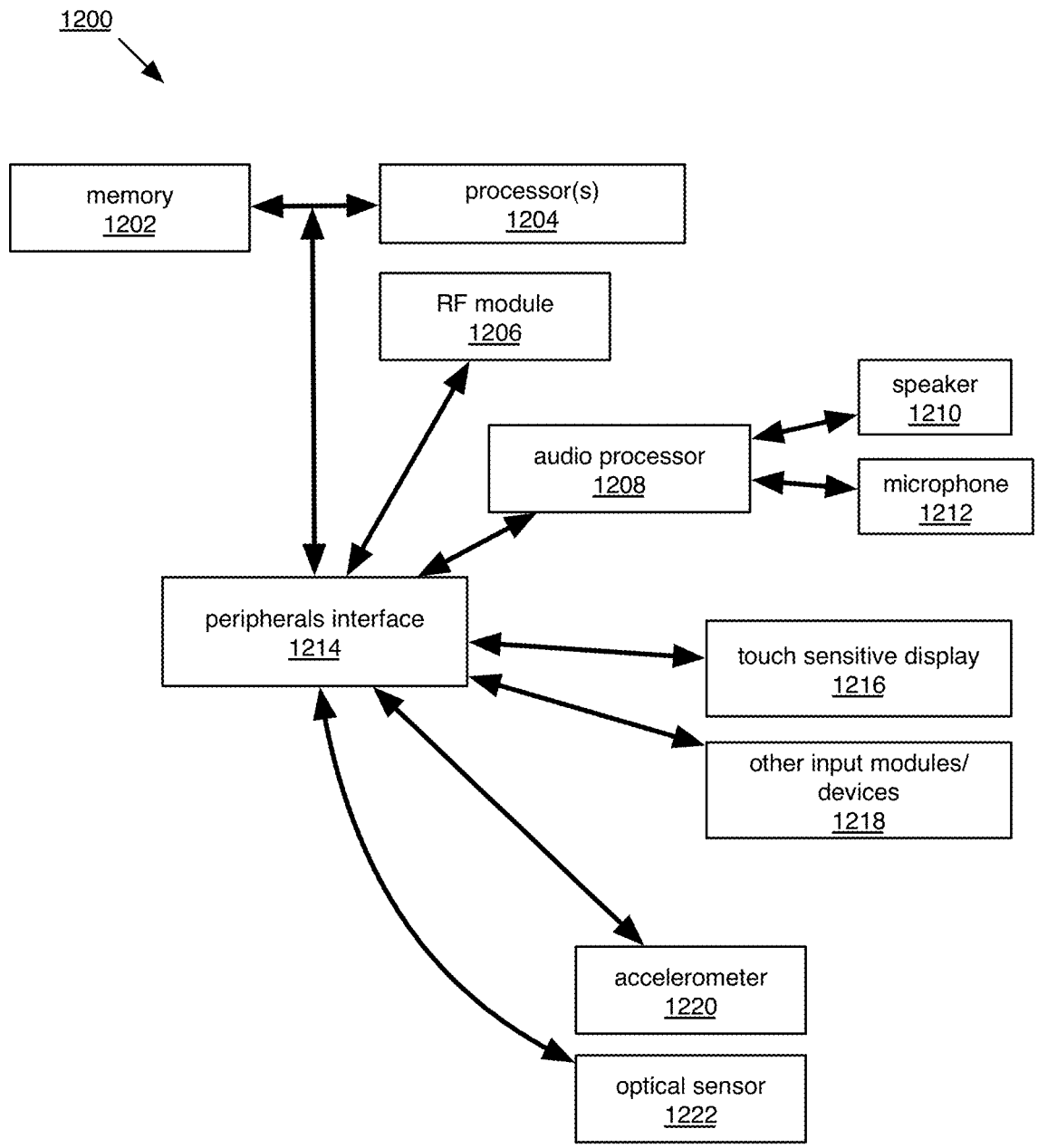
FIG. 12 is a block diagram showing an exemplary mobile computing device, consistent with some embodiments of the invention.

FIG. 12 is a block diagram showing an exemplary mobile computing device (e.g., mobile device 704). The device 1200 may have a memory 1202 which may include one or more types of computer readable medium, such as RAM, optical storage devices, or flash memory. Memory 1202 may store an operating system, applications, and communication procedures. Device 1200 may include one or more data processors, image processors, or central processing units 1204. Device 1200 may include peripherals interface 1214 coupled to RF module 1206, audio processor 1208, touch sensitive display 1216, other input modules/devices 1218, accelerometer 1220 and optical sensor 1222.

RF module 1206 may include a cellular radio, Bluetooth radio, NFC radio, WLAN radio, GPS receiver, and antennas used by each for communicating data over various networks.

Audio processor 1208 may be coupled to a speaker 1210 and microphone 1212. Touch sensitive display 1216 receives touch-based input. Other input modules or devices 1218 may include, for example, a stylus, voice recognition via microphone 1212, or an external keyboard.

Accelerometer 1220 may be capable of detecting changes in orientation of the device, or movements due to the gait of a user. Optical sensor 1222 may sense ambient light conditions, and acquire still images and video.

Figure 13:
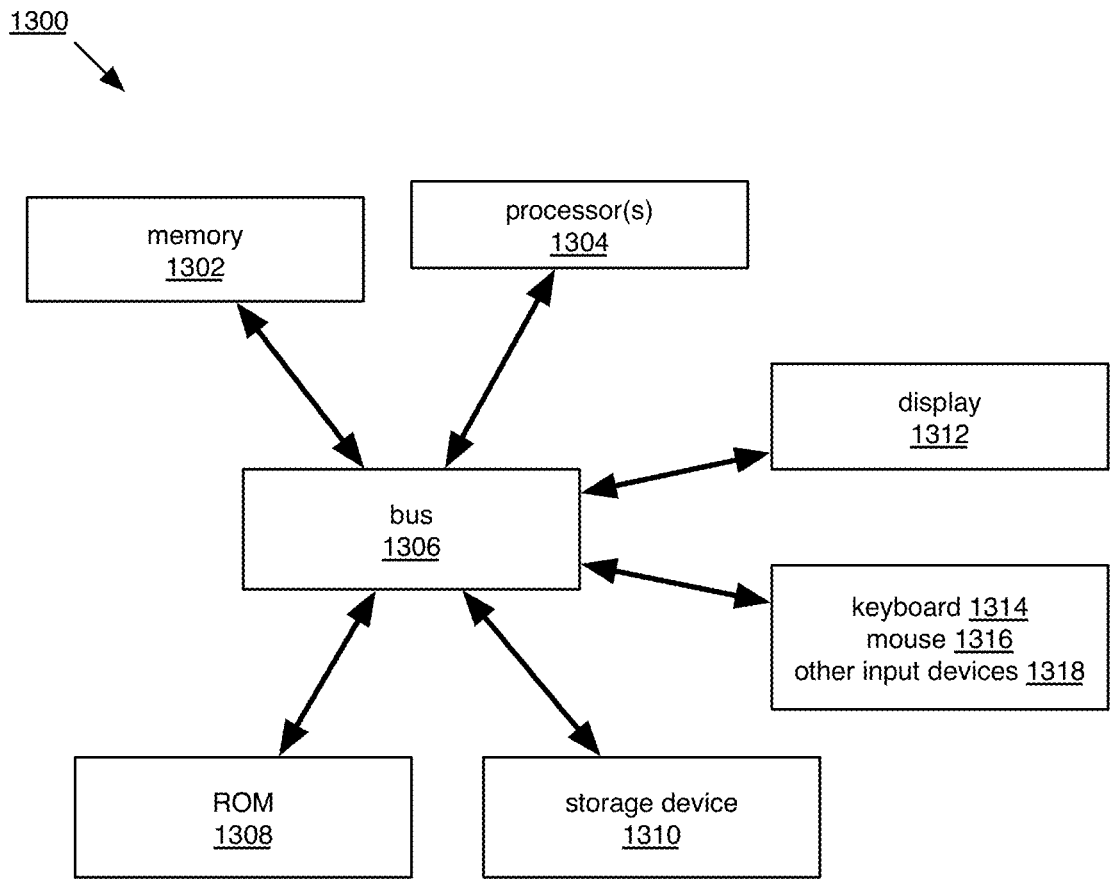
FIG. 13 is a block diagram showing an exemplary computing device, consistent with some embodiments of the invention.

FIG. 13 is a block diagram showing an exemplary computing system 1300 that is representative of any of the computer systems or electronic devices discussed herein. Note, not all of the various computer systems have all of the features of system 1300. For example, systems may not include a display inasmuch as the display function may be provided by a client computer communicatively coupled to the computer system or a display function may be unnecessary.

System 1300 includes a bus 1306 or other communication mechanism for communicating information, and a processor 1304 coupled with the bus 1306 for processing information. Computer system 1300 also includes a main memory 1302, such as a random access memory or other dynamic storage device, coupled to the bus 1306 for storing information and instructions to be executed by processor 1304. Main memory 1302 also may be used for storing temporary variables or other intermediate information during execution of instructions to be executed by processor 1304.

System 1300 includes a read only memory 1308 or other static storage device coupled to the bus 1306 for storing static information and instructions for the processor 1304. A storage device 1310, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 1304 can read, is provided and coupled to the bus 1306 for storing information and instructions (e.g., operating systems, applications programs and the like).

Computer system 1300 may be coupled via the bus 1306 to a display 1312 for displaying information to a computer user. An input device such as keyboard 1314, mouse 1316, or other input devices 1318 may be coupled to the bus 1306 for communicating information and command selections to the processor 1304.

The processes referred to herein may be implemented by processor 1304 executing appropriate sequences of computer-readable instructions contained in main memory 1304. Such instructions may be read into main memory 1304 from another computer-readable medium, such as storage device 1310, and execution of the sequences of instructions contained in the main memory 1304 causes the processor 1304 to perform the associated actions. In alternative embodiments, hard-wired circuitry or firmware-controlled processing units (e.g., field programmable gate arrays) may be used in place of or in combination with processor 1304 and its associated computer software instructions to implement the invention. The computer-readable instructions may be rendered in any computer language including, without limitation, Objective C, C#, C/C++, Java, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1300 or similar electronic computing device, that manipulates and transforms data represented as physical (electronic) quantities within its registers and memories into other data similarly represented as physical quantities within its memories or registers or other such information storage, transmission or display devices.

Figure 14:
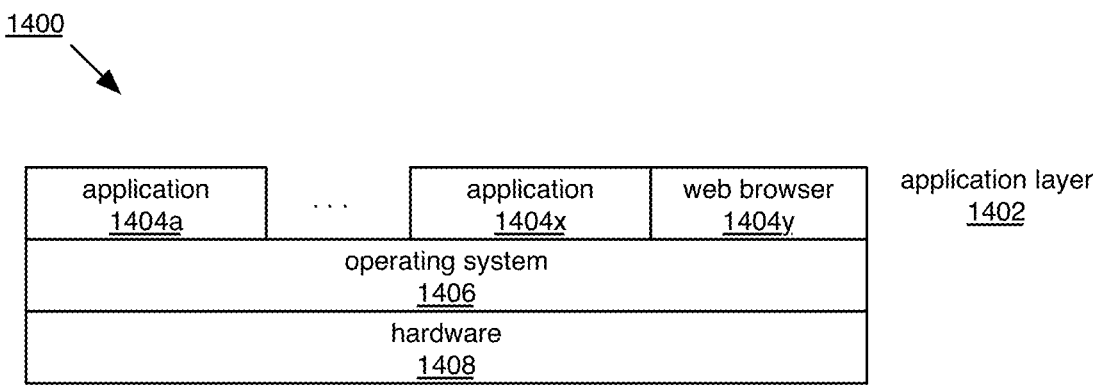
FIG. 14 is a block diagram showing an exemplary computing system, consistent with some embodiments of the invention.

FIG. 14 illustrates a computer system 1400 from the point of view of its software architecture. Computer system 1400 may be any of the electronic devices or, with appropriate applications comprising a software application layer 1402, may be a computer system for use with the monitoring system described herein. The various hardware components of computer system 1400 are represented as a hardware layer 1408. An operating system 1406 abstracts the hardware layer and acts as a host for various applications 1404, that run on computer system 1400. The operating system may host a web browser application 1404y, which may provide access for the user interfaces, etc.

The foregoing description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

What is claimed is:

1. A system, comprising:
a local system comprising:
one or more cameras configured to record video data;
a firearm;
a holster for receiving the firearm; and
a holster telematics sensor mounted to the holster adjacent to a barrel of the firearm,
wherein the one or more cameras and the holster telematics sensor are in communication via a personal area network,
wherein the one or more cameras are configured to change status in response to an unholstering event detected by the holster telematics sensor, and
wherein the holster telematics sensor comprises a processor coupled to a memory storing a rule set for defining behaviors of the one or more cameras and the holster telematics sensor, the processor configured to receive an updated rule set from a mobile device, the updated rule set instructing the local system to change from an off-duty status to an on-duty status, and, responsive to the on-duty status, to immediately turn on the one or more cameras, and, responsive to the on-duty status, further configured to record metadata on the memory concerning an event other than the unholstering event concerning the firearm for association with the video data recorded by the one or more cameras.

2. The system of claim 1,
wherein the local system further comprises a beacon,
wherein the beacon is mounted on a vehicle, and
wherein the one or more cameras are configured to change status based upon a detection of proximity to the beacon.

3. The system of claim 1, further comprising a server that is directly or indirectly in communication with the one or more cameras and with the holster telematics sensor using a wide area network.

4. A method, comprising:
receiving, by a holster telematics sensor, an instruction to change from an off-duty status to an on-duty status;
responsive to the on-duty status, identifying, by the holster telematics sensor, that a first event concerning a firearm has occurred;
responsive to the on-duty status, wirelessly transmitting, by the holster telematics sensor in direct communication with a camera, an instruction to change a status of the camera;
responsive to the on-duty status, wirelessly transmitting, by the holster telematics sensor, information regarding the changed status of the camera and a battery status of the holster telematics sensor to a remote server; and
responsive to the on-duty status, recording metadata concerning a second event for association with video recorded by the camera.

5. The method of claim 4, wherein the first and second events are selected from the group consisting of: a first user exiting a vehicle with the firearm, the first user entering the vehicle with the firearm, holstering the firearm, unholstering the firearm, discharging the firearm, the first user approaching a second user, the firearm being separated from the first user, loud noise being detected, and receiving a notification from the second user.

6. The method of claim 5, wherein the first event is unholstering the firearm, and the first event is detected using a pulse induction mechanism of the holster telematics sensor.

7. The method of claim 4, wherein the instruction to change the status of the camera is selected from the group consisting of: turning on the camera, waking up the camera, activating a recording of video at the camera, marking existing video to be retained, and marking new video to be retained.

8. The method of claim 7, wherein at least 30 seconds of the existing video is marked to be retained.

9. The method of claim 4, wherein the camera is mounted on a vehicle, mounted on eyegear, clipped to a vest, or mounted on a lanyard.

10. The method of claim 4, wherein the information transmitted to the remote server includes an alert message.

11. The method of claim 10, wherein the alert message is distributed to multiple recipients.

12. The method of claim 4, wherein the firearm is a handgun, a Taser, or a rifle.

13. The method of claim 4, wherein the information is only transmitted to the remote server when the firearm is associated with an on-duty status.

14. The method of claim 4, wherein the metadata comprises a time stamp and a category of the first event.

15. The method of claim 4, wherein the metadata is selected from one or more of: date, coordinates, altitude, firearm orientation, movement, translation, and bearing.

16. The method of claim 4, wherein the metadata comprises one or more of an ammunition type, or an amount of ammunition remaining.

17. The method of claim 4, wherein the metadata are provided as one or more tracks that map to a video file.

18. A system, comprising:
   a local system comprising:
   one or more cameras configured to record video data;
   a firearm;
   a holster for receiving the firearm; and
   a holster telematics sensor mounted to the holster adjacent to a barrel of the firearm,
   wherein the one or more cameras and the holster telematics sensor are in communication via a personal area network, and
   wherein the holster telematics sensor comprises a processor coupled to a memory storing a rule set for defining behaviors of the one or more cameras and the holster telematics sensor, the processor configured to receive an updated rule set from a mobile device, the updated rule set instructing the local system to change from an off-duty status to an on-duty status, and, responsive to the on-duty status, to change a status of the one or more cameras.

* * * * *